Patented July 19, 1932

1,868,221

UNITED STATES PATENT OFFICE

SAMUEL S. SADTLER, OF SPRINGFIELD TOWNSHIP, MONTGOMERY COUNTY, PENNSYLVANIA, ASSIGNOR TO AMIESITE ASPHALT COMPANY OF AMERICA, OF PHILADELPHIA, PENNSYLVANIA, A CORPORATION OF NEW JERSEY

ROAD COMPOSITION

No Drawing.   Application filed March 24, 1926.   Serial No. 97,142.

This invention relates to improvements in road compositions and in the methods of forming said compositions, and the principal object of the invention is to provide a bitumen road composition having certain novel and desirable properties hereinafter more fully described.

In manufacturing my road composition, I first form with a suitable bitumen liquefier a "water-in-oil" emulsion in which is suspended a suitable mineral filler. As the mineral filler, I prefer to employ lime, since this not only has a desirable effect upon the bitumen which is added later but also contains an element assisting in the formation of the type of emulsion desired. Thus, for example, where employing an oleate as the emulsifying agent, I may employ a fatty acid which with the calcium or magnesium in the lime will form the oleate which is the emulsifying agent in effecting the "water-in-oil" emulsion. Where other than lime is used as the mineral filler, I may add a small amount of calcium hydrate to form with the oleic acid calcium oleate which functions as aforedescribed.

As representative of the process of forming the emulsion, I may place in a suitable agitator the liquefier to be used, and which may for example be a heavy naphtha. In an agitator capable of making about a ton of coated aggregate, I may use about 1½ gallons of the naphtha. To this naphtha, I add while under agitation about 3½ fluid ounces of oleic or other fatty acid, and after this is thoroughly mixed in, I add dry freshly slaked lime. Although I prefer the freshly slaked lime, commercial hydrate of lime may be used. The lime which is added in powdered form is thoroughly incorporated in the mix, and then water is added slowly to complete the emulsion. The amount of lime employed may be approximately 2 pounds of a good grade of fat lime, preferably of high calcium content or containing magnesium, and the total added amount of water about 1½ quarts including the amount taken up by the lime when slaked. After agitating the mass for a few minutes, the emulsion is completed. Although this provides a thoroughly practical method for forming the desired emulsion, the invention is not limited to this procedure, and other methods may be found desirable for the purpose.

I now add to this emulsion the requisite amount of melted bitumen or asphalt until the bitumen is thoroughly incorporated with the liquefier, which is the external phase of the previously formed emulsion. Although I do not wish to limit myself to fixed proportions, I have found for certain purposes such as cold patch work in road repairing that 225 pounds of asphalt of 100° penetration for each 100 pounds of the naphtha emulsion described is highly satisfactory.

In some instances, I may use in forming the emulsion more water than specified above, and the amount of water may be varied as is found desirable to obtain a proper distribution of the lime or other filler.

I have found that a bitumen composition formed as described above has certain highly desirable properties of strength, toughness and durability not found in untreated bitumen.

In manufacturing road compositions, the bitumen including the emulsion prepared as described above is added in the usual manner to a stone aggregate so as to thoroughly coat the individual stones, and the bitumen-coated mass then laid and compacted on the roadbed in any desired manner.

I claim:

1. The process of forming a prepared bitumen for road compositions, which consists in forming a water-in-oil emulsion of naphtha containing calcium oleate and free hydrated lime in suspension, and mixing therewith a bitumen.

2. The process of forming a prepared bitumen for road compositions, which consists in mixing together a light bitumen liquefier, oleic acid, hydrated lime in excess of that required to form calcium oleate and water to form an emulsion, and mixing said emulsion with a bitumen.

3. The process of forming a bituminous cement emulsion for binding mineral aggregates for roadways and the like, which consists in agitating an oil which is a solvent of bitumen, and adding thereto a fatty acid, adding to the mixture while said agitation is continued, a finely divided alkaline material which will react with said acid to form an emulsifying agent and in quantity in excess of that required to react with said acid, and then adding to said mixture while said agitation is continued a relatively small quantity of water to form a water-oil-emulsion, and thereafter adding to said mixture, still under agitation, bituminous cement in a fluent condition.

SAMUEL S. SADTLER.